United States Patent
Dionisi

(10) Patent No.: US 12,484,106 B2
(45) Date of Patent: Nov. 25, 2025

(54) METHOD FOR SWITCHING A MOBILE STATION BETWEEN TWO WIRELESS ACCESS POINTS OF A COMMUNICATION NETWORK AND ASSOCIATED CONNECTION-MANAGEMENT DEVICE

(71) Applicant: SAGEMCOM BROADBAND SAS, Rueil Malmaison (FR)

(72) Inventor: Florent Dionisi, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 670 days.

(21) Appl. No.: 17/473,436

(22) Filed: Sep. 13, 2021

(65) Prior Publication Data

US 2022/0095183 A1 Mar. 24, 2022

(30) Foreign Application Priority Data

Sep. 22, 2020 (FR) ...................................... 2009585

(51) Int. Cl.
*H04W 76/25* (2018.01)
*H04W 36/08* (2009.01)
(Continued)

(52) U.S. Cl.
CPC ........... *H04W 76/25* (2018.02); *H04W 36/08* (2013.01); *H04W 36/165* (2013.01);
(Continued)

(58) Field of Classification Search
CPC ..... H04W 36/08; H04W 60/04; H04W 76/25; H04W 28/18; H04W 84/12;
(Continued)

(56) References Cited

U.S. PATENT DOCUMENTS 8,145,218 B2 * 3/2012 Hyziak ............... H04W 36/302
455/437
10,750,425 B2 * 8/2020 Nagasaka ............. H04W 36/36
(Continued)

OTHER PUBLICATIONS

May 25, 2021 Search Report issued in French Patent Application No. 2009585.

*Primary Examiner* — Dhairya A Patel
(74) *Attorney, Agent, or Firm* — Williams Mullen; R. Brian Drozd

(57) ABSTRACT

A method for switching the connection of a mobile station from a first point of wireless access to a communication network to which the mobile station is connected, to a second point of wireless access to said network, the method being implemented in a so-called "connection-management" device of said communication network, the method includes a modification of a value of a modulation or transmission-power parameter of the first wireless access point, the modified value of said parameter being of such a nature as to degrade the transmission performance between the first wireless access point and the mobile station compared with a transmission based on the value of said parameter before modification, and then a transmission to the mobile station of a message including a proposal to connect to the second wireless access point. The invention also relates to a connection-management device configured for implementing the method.

11 Claims, 5 Drawing Sheets

(51) Int. Cl.
*H04W 36/16* (2009.01)
*H04W 36/24* (2009.01)
*H04W 36/30* (2009.01)
*H04W 60/04* (2009.01)

(52) U.S. Cl.
CPC ....... *H04W 36/247* (2023.05); *H04W 36/304* (2023.05); *H04W 60/04* (2013.01)

(58) Field of Classification Search
CPC . H04W 36/165; H04W 36/24; H04W 36/385; H04W 36/0061; H04W 36/0094; H04W 36/30
See application file for complete search history.

(56) References Cited

U.S. PATENT DOCUMENTS

| | | | |
|---|---|---|---|
| 12,256,400 B2* | 3/2025 | Islam | H04L 1/1887 |
| 2003/0200333 A1* | 10/2003 | Espieu | H04L 45/24 |
| | | | 709/240 |
| 2004/0266474 A1 | 12/2004 | Petrus | |
| 2007/0217383 A1 | 9/2007 | Mitani | |
| 2013/0242940 A1* | 9/2013 | Jones | H04W 36/0061 |
| | | | 370/331 |
| 2014/0031042 A1* | 1/2014 | Smiley | H04W 24/02 |
| | | | 455/438 |
| 2017/0195931 A1* | 7/2017 | Mitsui | H04W 48/08 |
| 2019/0124570 A1 | 4/2019 | Tsuda et al. | |
| 2019/0174373 A1* | 6/2019 | Kanazawa | H04W 36/0085 |
| 2020/0022204 A1* | 1/2020 | Husted | H04L 1/0003 |
| 2020/0348662 A1* | 11/2020 | Cella | G05B 19/41865 |
| 2021/0243763 A1* | 8/2021 | Zhou | H04W 72/23 |
| 2022/0095183 A1* | 3/2022 | Dionisi | H04W 60/04 |

\* cited by examiner

METHOD FOR SWITCHING A MOBILE STATION BETWEEN TWO WIRELESS ACCESS POINTS OF A COMMUNICATION NETWORK AND ASSOCIATED CONNECTION-MANAGEMENT DEVICE

TECHNICAL FIELD

The present invention relates to the management of resources in a wireless communication network, and in particular to the management of the roaming of a mobile station between wireless access points of this communication network.

PRIOR ART

Establishing wireless local area networks WLAN offers great flexibility to the users of roaming communication devices, such as computers, tablets, smartphones, connected objects, etc. Such WLAN networks are for example established by access points integrated in residential gateways RGW made available by telecommunication operators, but also via devices for extending the range of such a network, or via devices connected to the network, such as a digital television set top box for example. Thus numerous wireless access points can coexist in the same local communication network further comprising any cabled connection points. Roaming protocols exist for the stations connected to wireless networks, enabling these stations to quickly move from a current connection by means of a first wireless access point to a new connection by means of another wireless access point of the same network. Often such a switching makes it possible to obtain a more powerful signal, which is of such a nature as to improve the overall performance of the transmissions between the wireless access point to which a station is connected and this station. This is all the more true when the station is a mobile station and the mobility thereof in a wireless communication network is great.

The IEEE 802.11k and IEEE 802.11v standardised protocols are designed to facilitate the roaming of mobile stations moving within the range of a plurality of access points of the same wireless network and being compatible with the previous and subsequent IEEE 802.11 wireless transmission standards. Thus a protocol according to the IEEE 802.11k standard enables a mobile station of an IEEE 802.11 wireless communication network to obtain a neighbourhood report comprising information representing the radio-frequency environment, and a protocol according to the IEEE 802.11v standard furthermore makes it possible to evaluate the connection between a wireless access point and a mobile station to orient the station to a given access point, for the purpose of obtaining better wireless transmission performance and/or to balance the load between a plurality of wireless access points. The use of the IEEE 802.11v protocol thus makes it possible to force a mobile station compatible with this protocol to change access point in a communication network, i.e. to switch its connection from a first access point of a communication network to a second access point of this communication network. However, some stations do not support this protocol. Another mechanism may be used, such as for example introducing an identifier of a relevant station in lists of stations prohibited connection in certain access points of one and the same communication network, or even in all the access points of a network, except one, namely the one that is selected as being the best access point for this mobile station. This mechanism has the drawback of interrupting the current communications, and therefore of presenting a substantial nuisance for a user of the mobile station the connection of which is modified. It also happens that a station compatible with the IEEE 802.11v protocol does not switch between a first wireless access point and a second wireless access point, despite the fact that such switching was proposed to it or demanded of it. The majority of modern stations implement the IEEE 802.11v protocol, but often integrate proprietary decision mechanisms. These stations rely on their own evaluations of the quality of transmissions for selecting a better wireless access point to a communication network. Although there exist numerous methods for switching a station from one access point to another, the final decision always falls to the station. The situation can be improved.

DISCLOSURE OF THE INVENTION

The aim of the invention is to force the switching of a connection of a station from a first wireless access point of a communication network to a second wireless access point of this network.

For this purpose, the object of the invention is a method for switching the connection of a mobile station, from a first point of wireless access to a communication network to which the mobile station is connected, to a second point of wireless access to said network, the method being implemented in a so-called "connection-management" device of said communication network, the method comprising:
modifying a value of a transmission parameter of at least the first wireless access point, the modified value of said parameter being of such a nature as to degrade the transmission performance between the first wireless access point and the mobile station compared with a transmission based on the value of said parameter before modification,
transmitting to the mobile station a message comprising a proposal to connect to the second wireless access point.

A first advantage is that it is possible to force a switching of connection of a station by "deceiving" it, i.e. by presenting it with personalised radio signal reception conditions for bypassing its own proprietary mechanisms for selecting a better access point.

A second advantage is that it is possible to have centralised management of the connections of the various stations connected to the communication network. The management then being centralised by a "connection-management" device implemented in a wireless access point of the communication network or in any other device of the communication network configured for making transmissions from and to the wireless access points of the communication network and the stations connected to the communication network.

The method according to the invention may also comprise the following features, considered alone or in combination:
The modified transmission parameter is a modulation or power parameter. Thus it is possible to act on the performances of a transmission involving the first wireless access point.
The method for switching the connection comprises, prior to the step of modifying a value of a parameter:
selecting the second wireless access point as the best candidate for a wireless connection of the mobile station to said network, the second wireless access point being selected from a plurality of wireless access points of said communication network, said plurality of wireless access points comprising at least the first and second wireless access points, an evaluation of the best candidate before selection being made in accordance with a predetermined criterion.

It is thus possible to force a mobile station to connect to the access point determined as being the best wireless access point for a given station at a given moment, according to the radio environment for example.

The at least one predetermined criterion for evaluating the best candidate being in the list:
a number of stations connected to the first wireless access point,
a number of stations connected to the second wireless access point,
a mean number of stations connected per wireless access point to said communication network,
a reception signal strength indicator representing a signal received by the mobile station during a transmission from a wireless access point,
a transmission rate to or from the mobile station.

Thus it is advantageously possible to organise the various connections of the stations not only according to the transmission performance on the communication links, but also according to criteria such as for example the load on a wireless access point or the respective transmission rates through the various wireless access points, so as to optimise the overall performance of the communication network.

The connection switching method comprises, prior to the step of selecting the second wireless access point:
obtaining from the mobile station information representing the perception of the first and second wireless access points by the mobile station.

The connection switching method further comprises, subsequently to the transmission to the mobile station of the message comprising a proposal to connect to the wireless access point:
detecting a connection of the mobile station to the second wireless access point,
recording the modified value of the modulation or transmission-power parameter to which the connection of the mobile station to the second wireless access point was made and detected, the recording of the modified value being implemented in combination with an identifier of the mobile station particular to the station or an identifier of the mobile station seen in the communication network.

Another object of the invention is a so-called "connection-management" device of a communication network, said device comprising electronic and/or radio circuits configured for:
modifying a value of a modulation or transmission-power parameter of at least one first point of wireless access to the network, the modified value of the parameter being of such a nature as to degrade the transmission performance between the first wireless access point and a mobile station connected to this first wireless access point, compared with a transmission made based on the value of the parameter before modification,
transmitting to the mobile station a message comprising a proposal to connect to a second wireless access point.

Another object of the invention is a device of a point of wireless access to a communication network comprising a connection-management device according to the preceding claim.

The invention also relates to a communication network comprising a connection-management device as previously described or a wireless access point device comprising a connection-management device as aforementioned.

Finally, the invention relates to a computer program product comprising program code instructions for performing the steps of the method previously described, when the program is executed by a processor, as well as an information storage medium comprising such a computer program product.

The invention also relates to a computer program product comprising program code instructions for performing the steps of the method previously described when the program is executed by a processor, as well as an information storage medium comprising such a computer program product.

BRIEF DESCRIPTION OF THE DRAWINGS

The features of the invention mentioned above, as well as others, will emerge more clearly from the reading of the following description of at least one example embodiment, said description being made in relation to the accompanying drawing, among which.

DETAILED DISCLOSURE OF EMBODIMENTS

Figure 1:
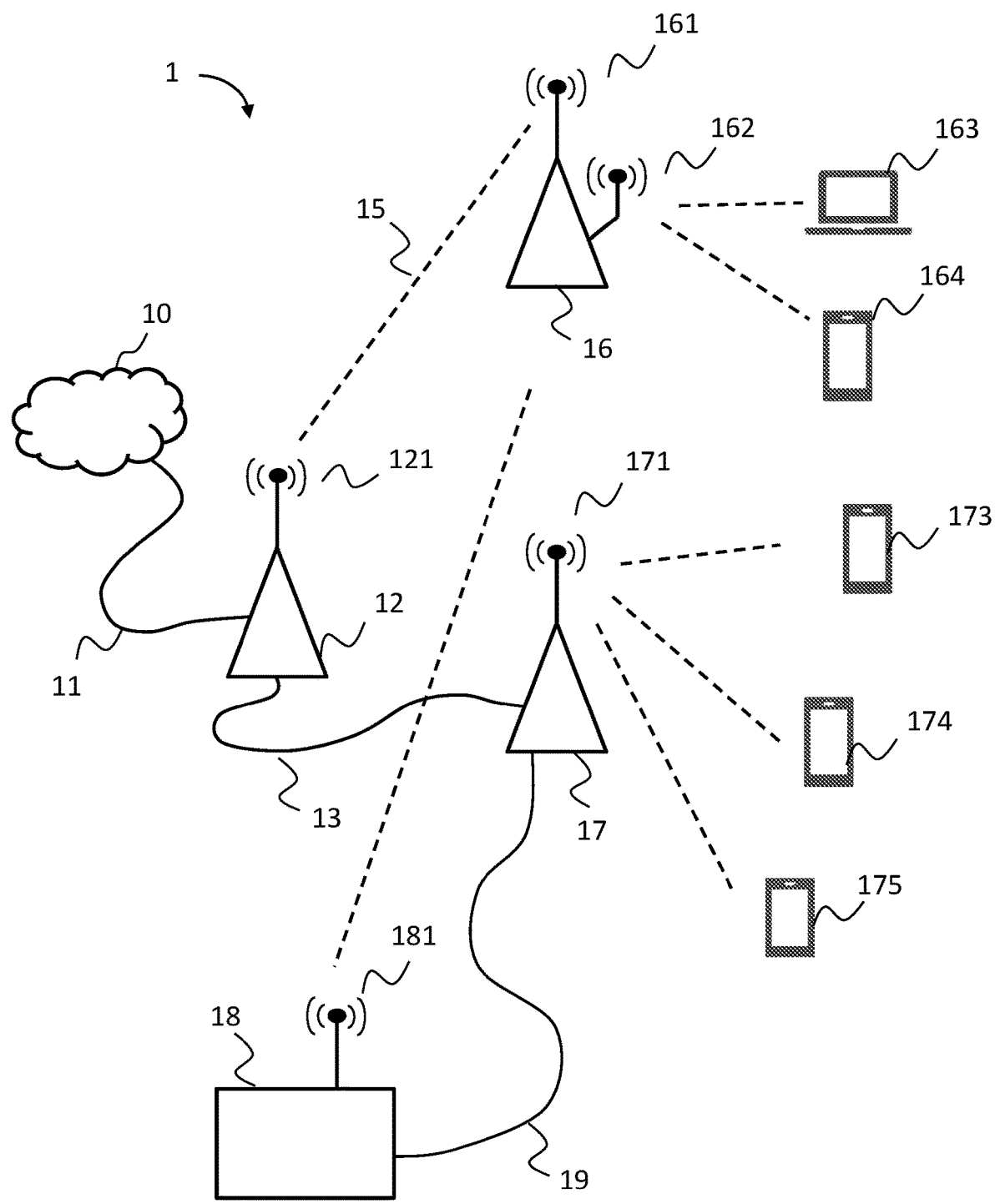
FIG. 1 illustrates a domestic local communication network comprising a plurality of points of wireless access to the network and a connection-management device configured for implementing a method for forced switching of the connection of a mobile station according to one embodiment.

FIG. 1 illustrates schematically a communication network 1 of the local area network type comprising a wireless communication coverage extension system. For example, the communication network 1 is a home network. The communication network 1 is connected to a wide area network 10. According to one embodiment, the wide area network 10 is the internet. The communication network 1 is connected to the wide area network 10 by means of a network gateway 12 configured for implementing all the functions useful to a connection between a wide area network and a local area network. The network gateway 12 is connected to the wide area network 10 by means of a connection link 11. The connection link 11 is for example a telephone subscriber line, and the connection uses for example an ADSL (the English abbreviation for "asymmetric digital subscriber line") technology, a connection of the optical fibre type or a wireless connection of the fixed wireless access type based on 4G and/or 5G technologies for example. The network gateway 12 comprises a radio resource 121 and an Ethernet cable interface (not shown in the figure) for a connection to a local area network, and performs communication node functions. The communication network 1 further comprises two other communication nodes 16 and 17. According to one embodiment, the communication node 17 is an electronic device of the digital television receiver-decoder type, commonly referred to as a set top box, which also comprises an Ethernet connection interface (not shown in the figure), for a connection to a local area network, and the communication node 16 is a wireless local area network repeater in the form of a Wi-Fi relay terminal for a wireless local communication network. According to one embodiment, the communication node 16 is connected to the network gateway 12 by means of a wireless communication link 15, and the communication node 17 is connected to the communication gateway 12 by means of a cable link 13. The communication node 17 comprises a radio resource 171 and the communication node 16 comprises two radio resources 161 and 162. The communication nodes 16 and 17 are configured for communications with the network gateway 12 and constitute a backhaul subnetwork of the communication network 1. The radio resources 162 and 171 are each configured for performing functions of wireless access point to the communication network 1.

Mobile stations 163, 164, 173, 174 and 175 are connected to the communication network 1 by means of the wireless access points 162 and 171. The mobile stations 163 and 164 are connected to the communication network 1 by means of the wireless access point 162 of the communication node 16, and the user devices 173, 174 and 175 are connected to the communication network 1 by means of the wireless access point of the communication node 17. According to one embodiment, the mobile stations 164, 173, 174 and 175 are smartphone devices, and the mobile station 163 is a portable computer, also commonly referred to as a laptop. The connections between wireless access points of the communication nodes 16 and 17 and the mobile stations 163, 164, 173, 174 and 175 constitute a user subnetwork known as a frontal or fronthaul subnetwork of the communication network 1. According to one embodiment, all the communication nodes of the local area network 1, namely the network gateway 12, the set top box 17 and the relay terminal 16, as well as the user devices 163, 164, 173, 174 and 175, are configured for implementing wireless communications according to the features and protocols in accordance with one of the IEEE 802.11 standards.

According to one embodiment, the communication network 1 further comprises a connection-management device 18 configured for managing all the wireless connections between the mobile stations 163, 164, 173, 174 and 175 and the wireless access points 162 and 171 of the frontal subnetwork. According to one embodiment of the invention, the connection-management device 18 is configured for communicating with the wireless access points 162 by means of a radio resource 181 connected by wireless connection to the radio resource 161 of the communication node 16 and with the wireless access point 171 by means of a cable connection 19 of the Ethernet type. Thus the connection-management device 18 is inserted in the backhaul subnetwork of the communication network 1. According to variants, the communication links between the connection-management device 18 and the wireless access points 162 and 171 of the frontal subnetwork of the communication network 1 may be implemented differently. For example, the communication node 17 may comprise a supplementary radio resource connected to the radio resource 181 of the connection-management device 18 to establish a wireless communication link that can be used in place of the cable link 19.

In one embodiment, the connection-management device 18 is an entity included in the network gateway 12. This arrangement allows a simplified centralisation of the management of the connections.

In another embodiment, the connection-management device 18 is an entity included in one of the nodes of the communication network 1, such as the communication node 16 or the communication node 17. This arrangement makes it possible to have a management of the connections on one of the nodes offering a frontal subnetwork.

In another embodiment, some devices of the communication network 1 each comprise respectively a connection-management device 18. These connection-management devices 18 cooperate together in a distributed manner or in a master-slave mode. This arrangement makes it possible to distribute the operations of managing the connections through the devices of the communication network 1.

Advantageously, in one embodiment, the connection-management device 18 is configured for implementing and controlling protocol exchanges according to the IEEE 802.11k and IEEE 802.11v protocols between the wireless access points 162 and 171 on the one hand and the mobile stations 163, 164, 173, 174 and 175 on the other hand. Thus the connection-management device 18 is able to supervise protocol exchanges in accordance with the IEEE 802.11k and IEEE 802.11v protocols with each of the mobile stations 163, 164, 173, 174 and 175, via one or other of the wireless access points 162 and 171, or directly by implementing wireless access point functions by means of its own radio resource 181. In another embodiment, independently or in addition to the IEEE 802.11k and IEEE 802.11v protocols, the connection manager 18 is able to supervise protocol exchanges according to the IEEE 802.11r protocol with each of the mobile stations 163, 164, 173, 174 and 175.

Advantageously, in one embodiment, the connection-management device 18 can obtain, via the IEEE 802.11k or IEEE 802.11v protocols or via another type of adapted collection procedure, such as with protocol steps of the IEEE 802.11r protocol, a state of perceiving the various wireless access points 162 and 171 seen from each of the mobile stations 163, 164, 173, 174 and 175 and analysing the global situation or the situation for each of the mobile stations considered independently of the others. Thus the connection-management device 18, implementing a centralised management of the connections, can determine whether a connection to a wireless access point is more opportune at a given instant, for a given mobile station, than a connection to another wireless access point. For example, if the connection-management device 18 determines, from information obtained, that the mobile station 164 is benefiting from a stronger reception signal level from the wireless access point 171 than from the wireless access point 162, the management device can seek a switching of the wireless connection of the mobile station 164 from the wireless access point 162 to the wireless access point 171, by sending a message to this effect according to the IEEE 802.11v protocol in one example.

According to one embodiment of the invention, the connection-management device 18 is configured for forcing the requested switching of the mobile station 164 if the latter does not implement the requested connection switching in response to a previously sent protocol message. Cleverly, the management device 18 controls a transmission of signals from the wireless access point to be left (in this case the wireless access point 162) and from the wireless access point to be joined (in this case the wireless access point 171), to the mobile station concerned (here the mobile station 164)

to force the station to find that the best choice of connection is the one that was requested, although said station has not reacted to the request with a view to a switching of connection.

To do this and according to a first embodiment, the connection-management device 18 performs, for example, a reconfiguration of the access point to which the mobile station 164 is connected by modifying the value of a transmission parameter of the wireless access point 162 so that the modified value of the parameter is of such a nature as to degrade the transmission performance between the wireless access point 162 and the mobile station 164 compared with the current performance, i.e. compared with the transmission performance observed before the value of said parameter was modified. In one example, the parameter the value of which is modified relates to the modulation of the transmission. In another example, the parameter the value of which is modified relates to the power of the transmission. Again in another example the parameter the value of which is modified is a parameter of the physical layer known as "PHY", or a parameter of the level 2 layer known as "MAC", or a parameter of a higher layer, said parameter being able to have an influence on the transmission performance between the wireless access point 162 and the mobile station 164 (the number of retransmissions that can be configured on the level 2 or level 3 layer for example, the value of an event triggering or expiry time known as "timer" for example, a triggering threshold known as threshold in another example). According to a variant, the connection-management device 18 modifies the value of a plurality of parameters, such as the modulation and/or power parameters in one example. The connection-management device 18 next transmits, to the mobile station 164, a new protocol message comprising a proposal to connect to the wireless access point 171.

Thus the modification made on the basis of the results of analysis of prior measurements made using the IEEE 802.11k protocol, for example, it is possible to influence the mobile station 164 by acting on its decision mode whatever it may be (for example a proprietary decision mode defined by the manufacturer of the mobile station 164). Such a modification of a transmission parameter value may for example relate to a parameter of the 11n, 11ac and 11ax protocols of one of the IEEE 802.11 standards. Thus at least one embodiment of the present invention relates to a method for forced switching of the connection of a mobile station from a first wireless access point of a communication network to a second wireless access point of this network. At least one embodiment relates to a method for switching the connection of a mobile station, forced by a deliberate degradation of the performance of a transmission to the station.

According to one embodiment, successive modifications of the value of a parameter are made gradually until a switching of the connection of the mobile station concerned to the targeted wireless access point is obtained. Advantageously, when a switching of the connection of a mobile station is thus performed and detected, from a first wireless access point to a second wireless access point, the value of the modified transmission parameter that caused the connection switching can be recorded in a database, combined with an identifier of the mobile station. It is thus advantageously possible to implement a learning of the behaviour of each of the mobile stations present in a communication network for the purpose of better predicting the future behaviour of a mobile station in response to a parameter modification. Advantageously, such an operating method makes it possible to accelerate the forced switching of the connection of a mobile station when such a switching is judged necessary by the connection-management device 18.

According to a second embodiment, the connection-management device 18 sends a message to the mobile station 164 for which it has analysed that a connection switching is desirable or required, from the first wireless access point 162 to the second wireless access point 171, this message being configured for requesting the mobile station 164 to perform an active scan via a sending of a probe request message. At the same time, the connection manager 18 performs a reconfiguration of the wireless access points other than the targeted wireless access point 171. This is because sending a probe request message according to an IEEE 802.11 protocol enables a station wishing to connect to a network to obtain information from the various wireless access points within range of this station. By proceeding in this way, the connection manager 18 there also deceives the mobile station 164, by presenting to it performances that are deliberately degraded on the part of all the access points except for the targeted access point 171. In this case, in the example presented, the connection-management device 18 reconfigures a value of a transmission parameter, such as a parameter relating to the modulation or to the power of the wireless access point 162, so that the mobile station 164 perceives better connection conditions on the part of the wireless access point 171 than on the part of the wireless access point 162. The mobile station 164 can then only select the wireless access point 171 for establishing a new connection, and a switching of connection between the first wireless access point 162 and the second wireless access point 171 is performed. Obviously, a gradual modification of a parameter may also be used according to this embodiment, so as to identify a threshold value of the transmission parameter for which the mobile station 164 has performed a switching, which makes it possible to record this threshold value in combination with an identifier of the mobile station 164 and to supply a learning database in order to be able to accelerate a future switching, with a wealth of knowledge acquired of the behaviour of the mobile station forced to perform a connection switching.

According to a third embodiment, the connection-management device 18 reconfigures the transmission power of the beacon frames sent by the access point 162, so that this power remains acceptable for the other mobile stations that are connected thereto (here, in this case, the mobile station 163) but so that the beacon frames sent by the wireless access point 162 are no longer perceptible to the mobile station 164. The transmission power of the beacon frames of the other wireless access points remaining unchanged, including here in particular the wireless access point 171, the mobile station 164 loses the wireless access point 162 from view and has no other solution than connecting to the wireless access point 171. Thus the connection manager 18 there also performs a forced switching of the mobile station 162 from the first wireless access point 162 to the second wireless access point 171.

According to a fourth embodiment, the connection-management device 18 reconfigures the transmission power of the beacon frames sent by the access point 171. For example, the connection-management device 18 temporarily configures upwards the transmission power of the beacon frames sent by the access point 171. Thus the mobile station 164 detects that the access point 171 is offering transmission conditions that are more favourable than those of the access point 162.

In other embodiments, the connection-management device 18 combines the various adjustments of transmission parameter value. For example, the connection-management device 18 reconfigures a transmission parameter value of the access point 162 (for example by reducing its transmission power) and reconfigures a transmission parameter value of the access point 171 (for example by increasing its transmission power). In other examples, the connection manager 18 combines reconfigurations of values of other parameters able to influence the transmission between a mobile station and a wireless access point.

Figure 2:
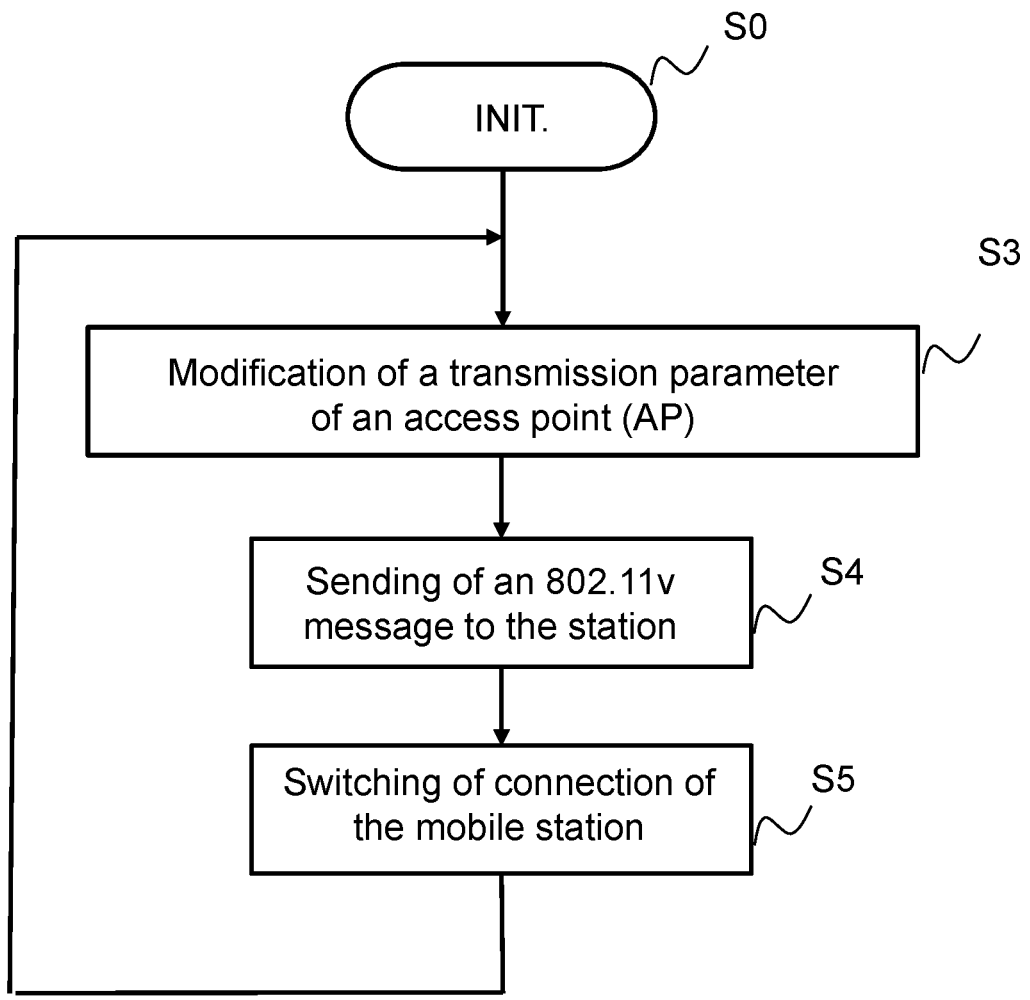
FIG. 2 is a flow diagram illustrating steps of a method for the forced switching of a mobile station from a first wireless access point to a second wireless access point, according to one embodiment, as implemented by the connection-management device of the network shown in FIG. 1.

FIG. 2 is a flow diagram illustrating essential steps of the method for switching the connection of the mobile station 164, performed by the connection manager 18. The method illustrated performs a switching of connection of the mobile station 164 from the first point 162 of wireless access to the communication network 1, to which the mobile station 164 is initially connected, to the second point of wireless access to the communication network 1.

A step S0 corresponds to a nominal functioning of the various devices of the communication network 1 at the end of an initialisation of all the devices present in the network. In other words, all the devices shown in FIG. 1 coexist in the communication network 1 and perform transmissions required according to the proper functioning of each mobile station, as well as to the communication node devices of the communication network 1. At this stage, after having determined that a switching of connection of the mobile station 164 is desirable or required, by analysing the situation of all the connections of the mobile stations connected to the communication network 1, the connection-management device 18 sends a message in accordance with the IEEE 802.11v protocol to the mobile station 164, said message comprising an invitation to connect to the wireless access point 171, rather than to the wireless access point 164. If the mobile station 164 is compatible with the IEEE 802.11v protocol and its behaviour in terms of connection (or connection preferences) is not guided by a proprietary algorithm, the station connects to the wireless access point 171, in accordance with the request that was sent to it by the connection-management device 18. In the contrary case, the connection manager 18 at the step S3 initiates a forced switching of the connection of the mobile station 164, from the wireless access point 162 to the wireless access point 171. For example, the connection-management device 18 may define an operating mode for forcing the connection switching on the basis of the information previously given in a learning database and which makes it possible to know or predict the "average" behaviour of a mobile station that had already been connected or again which is identified by means of a manufacturer identifier particular to this type of mobile station. Thus the connection-management device 18 selects, for example according to information available to it in relation to the mobile station 164, in particular in its learning database, a "strategy" of switching among the various possibilities, which are:

a modification of a value of a sending or transmission parameter of the current wireless access point 162, so as to deliberately degrade the transmission performance between the current access point 162 and the mobile station 164, a request to the mobile station 164 to perform an active scan via a frame transmission of the probe request type, associated with a reduction of the transmission power of the wireless access points other than the wireless access point 171, the target of the switching, or a modification of the transmission power of the beacon frames from the various wireless access points other than the wireless access point 171, the target of the switching.

Preferentially, the connection manager 18, in the step S3, modifies a value of a transmission parameter of the wireless access point 162 so as to degrade the transmission performance between the first wireless access point 162 and the mobile station 164 compared with a transmission based on the value of said parameter before modification. For example, the transmission power of the signal transmitted by the wireless access point is reduced. Next, and whatever the strategy implemented, the connection-management device transmits, to the mobile station 162, in a step S4, a new message comprising a new proposal to connect the mobile station 164 to the second wireless access point 171.

Finally, whether because of a compatibility with an IEEE 802.11v protocol or according to the connection preferences implemented by a proprietary algorithm, the mobile station 164 has no other choice than to connect, in a step S5, to the second wireless access point 171, if the deliberate degradation of the performance is sufficiently great to cause a switching of connection.

Thus, cleverly, and according to the invention, a sufficient modification of a value of a transmission power of the first wireless access point 162 or of all the available wireless access points other than the second wireless access point 171, the target of the desired or required connection switching, of such a nature as to degrade the transmission performance between the first wireless access point 162 and the mobile station 164 compared with a transmission based on the value of said parameter before modification, followed by the transmission to the mobile station 164 concerned of a message comprising a proposal to connect to the second wireless access point 171, suffices to force a switching of the connection of the mobile station 164 concerned to the target wireless access point 171.

The words "sufficient modification of a value of a modulation or power parameter" are to be interpreted here as a modification of the value causing a degradation in transmission performance such that a connection switch takes place, whether this parameter value modification concerns for example the transmission power of a signal or the transmission power of beacon frames. In another example, the value of the modification parameter is increased, i.e. the value representing the modulation and coding scheme or MCS is modified so as to change from a robust coding scheme known as quadrature phase shift keying or QPSK to a coding known as quadrature amplitude modulation or QAM, less robust than the QPSK scheme but offering a better symbol transmission rate. Since the QAM scheme is less robust, and with a transmission power unchanged and adapted to a QPSK transmission, degradations, such as errors during decoding of the packets transmitted, on the transmission between the mobile station 164 and the wireless access point 162 are expected. In another example, the value of the maximum number of retransmissions of a packet transmitted is decreased. Typically, a packet may be retransmitted four or five times, these various retransmissions being able to be combined in the receiver of the mobile station 164 (or respectively in the receiver of the wireless access point 162) in order to improve thereby the decoding changes. By reducing the maximum number of retransmissions of a packet, the chances of successfully decoding a packet decrease, thus causing degradations on the transmission between the mobile station 164 and the wireless access point 162.

According to a variant of the embodiment, the management device 18 operates by successive modifications of the value of a transmission parameter, so that the switching does not necessarily take place immediately after a first modification of the value of the parameter, but after a series of successive modifications that have caused a gradual degradation in the transmissions between the first wireless access point 162 and the mobile station 164. Advantageously, this variant makes it possible to define a threshold of switching of the connection in correlation with the transmission parameter used (modified) for making a forced switching. In the case where a modification of value of a parameter is not sufficient, the method may make provision for making a modification of the value of one or more supplementary transmission parameters.

Figure 3:
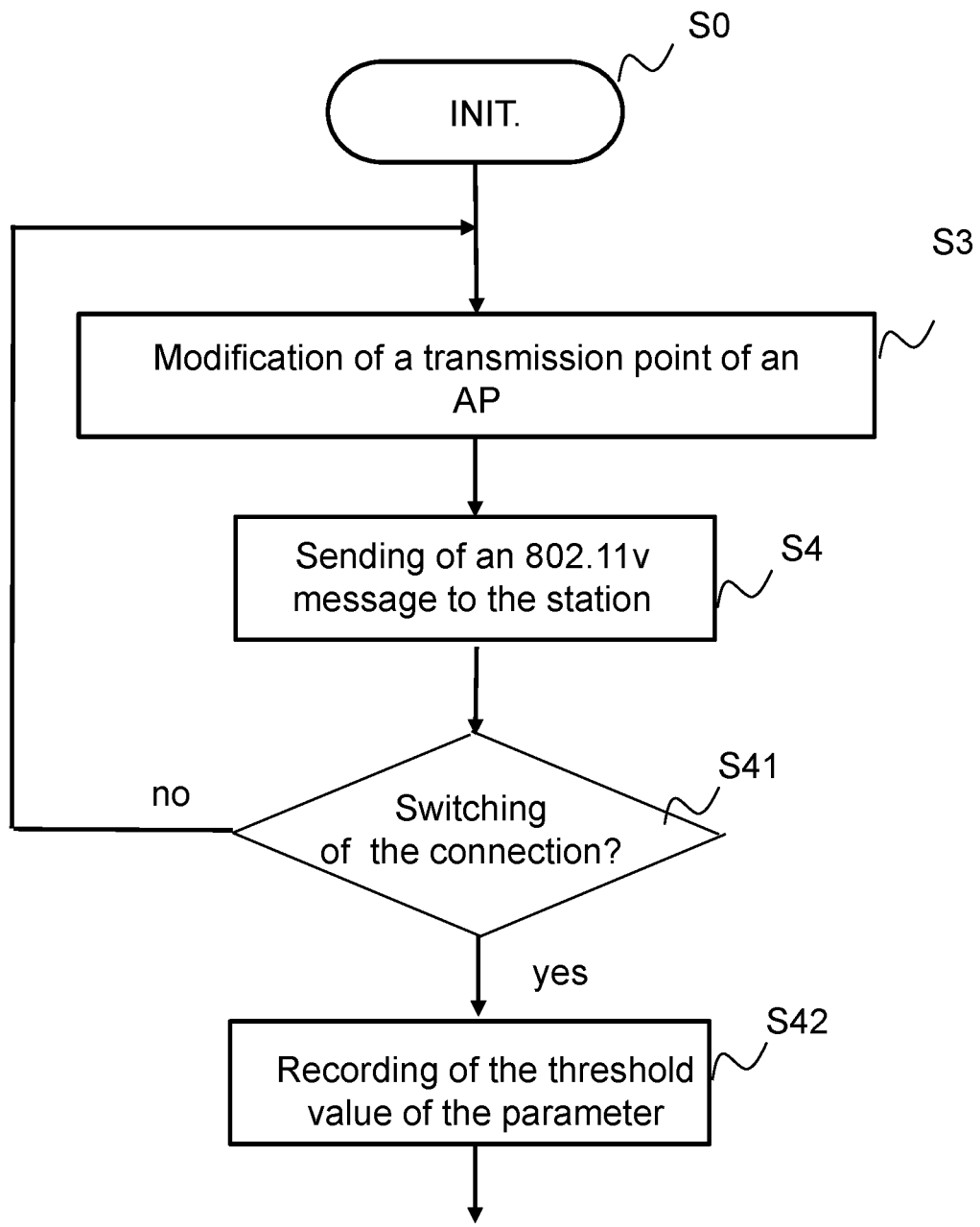
FIG. 3 is a flow diagram illustrating a first variant of a method shown in FIG. 2 for forced switching of a mobile station.

FIG. 3 shows a first variant of a forced switching method for which a looping is implemented around the steps S3 of modifying a value of a transmission parameter of the wireless access point 162 and S4 of sending a protocol message comprising an invitation to connect to the wireless access point 171, the target of the switching. According to this variant, in a step S41 that follows the step S4, a detection of switching of the connection of the mobile station 164 is implemented. In the case where the switching of the connection has taken place to the wireless access point 171, the parameter value that made it possible to result in a connection switching is recorded in an information database representing the behaviour of the various mobile stations, faced with protocol messages according to IEEE 802.11v or faced with forced connection switching methods implemented according to the operating modes described here. Thus the connection manager 18 advantageously has available a behaviour database making it possible best to adjust the value of a modified transmission parameter, when a rapid connection switching is required. Advantageously, the method shown in FIG. 3 may include a supervision, by the connection-management device 18, of the perception that the mobile station 164 concerned has, by means of protocol messages defined according to IEEE 802.11k. For example, the connection-management device 18 may send regularly, or even at each iteration of the loop formed by the steps S3, S4 and S41, a message for the purpose of knowing an estimation of the signal perceived by the mobile station 164, such as the received signal strength indicator or RSSI of the signal sent by the first access point 162 and seen by the mobile station 164, or a message for the purpose of knowing the RSSI of the signal sent by the second access point 171, or both, throughout the gradual and deliberate degradation of the performances of transmissions to the mobile station 164.

Figure 4:
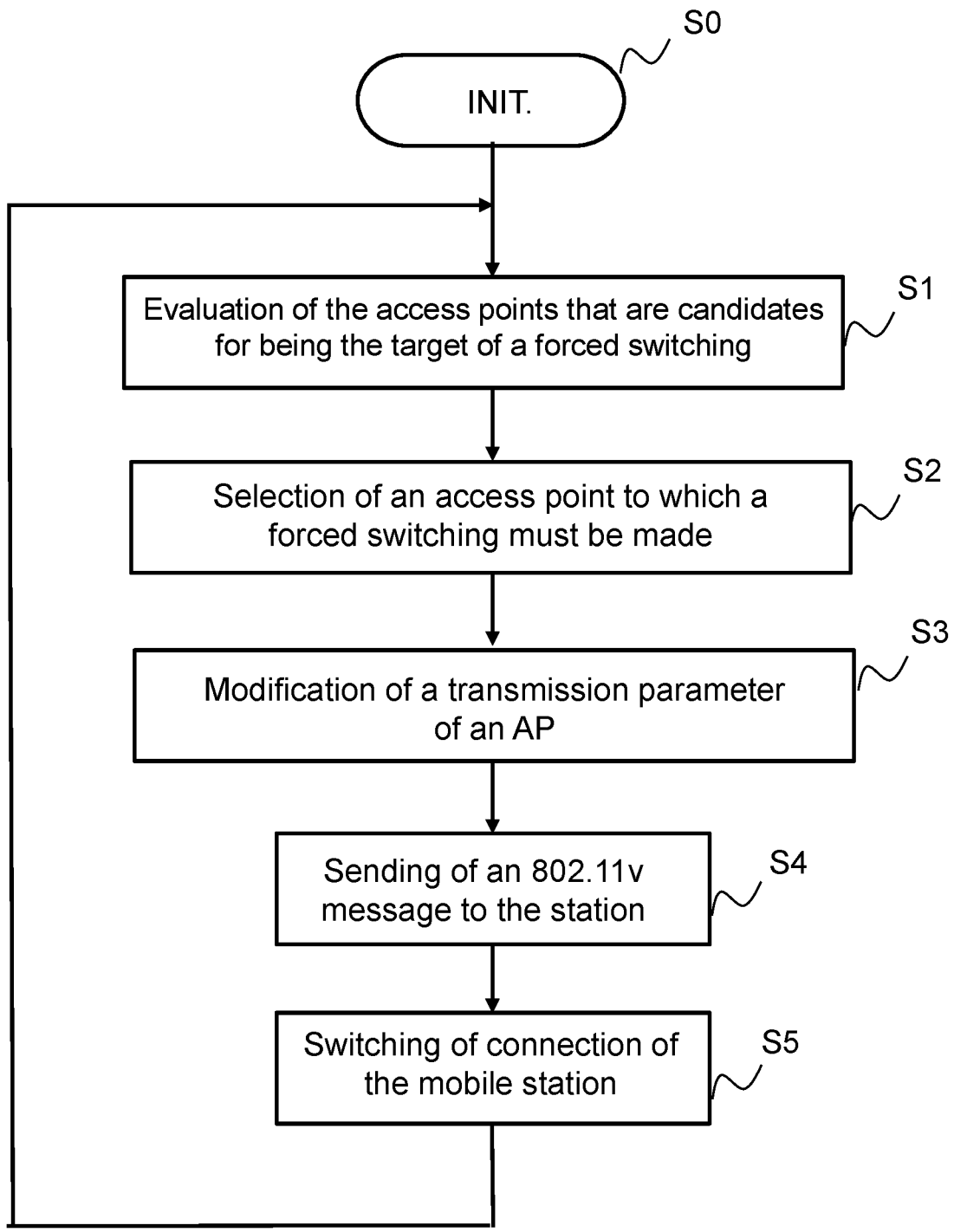
FIG. 4 is a flow diagram representing a second variant of a method shown in FIG. 2 for forced switching of a mobile station; and, FIG. 5 is an outline diagram illustrating an architecture of a connection-management device configured for forcing a switching of connection of a mobile station connected to the communication network of FIG. 1 according to one embodiment.

FIG. 4 shows a second variant of the embodiment of a method for forced switching of the connection of the mobile station 164 to the communication network already illustrated on FIG. 2. The method described according to this variant comprises, prior to the step S3 of modifying a transmission parameter of the first access point 162, a step S2 of selecting the second wireless access point 171 during which this second wireless access point 171 is defined as being the best candidate for a wireless connection of the mobile station 164 to the communication network 1.

During the step S2, the second wireless access point 171 is selected from the plurality of wireless access points 162 and 171, and optionally one or more other available wireless access points used in the communication network 1.

The selection of the second wireless access point 171 as the target of a switching, made during a selection step S2, may be part of a contextual analysis particular to the behaviour or to the performance of the single mobile station 164, or a contextual analysis of the environment close to this mobile station 164 (in particular the radio environment, or a contextual analysis of the whole of the communication network 1 or of one of the subassemblies thereof (the frontal subnetwork for example).

Thus such a selection may result from a step S1 of evaluating the access points of the communication network 1 that are candidates for being the target of a forced switching. This evaluation step S1 is prior to the selection step S2, and aims to analyse for example the performances of the transmissions made or other aspects such as the load of each of the wireless access points, or of each of the access points (wireless or cable), the number of connections detected on each of the access points, the mean number of connections per access point or per wireless access point, a transmission rate on any communication link of the communication network, in particular from or to a mobile station, or an indicator of a reception level of the strength of the signal transmitted by a wireless access point seen from a mobile station (for example an RSSI); these examples not being limitative. Thus each of these elements may serve as a criterion for evaluating the situation of one or more mobile stations, considered alone or in combination with one or more other elements listed above.

Advantageously, in order to be able to have available detailed information for evaluating the situation of one or more mobile stations such as for example the mobile station 164, the connection-management device 18 uses protocol messages according to IEEE 802.11k to obtain, from the mobile station 164, information representing the perception of the first and second wireless access points 162 and 171, by the mobile station 164. According to one embodiment, the connection management device 18 transmits these messages via the wireless access points 162 and/or 171.

Advantageously, the connection-management device 18 uses mechanisms described in IEEE 802.11 such as the so-called radio measurements mechanisms indicated in paragraph 4.3.11 of the current IEEE 802.11 standard.

Obviously, the first and second variants described are not exclusive and can be combined with each other.

Moreover, these first and second variants described may also be implemented according to the IEEE 802.11r protocol.

The step S1 of evaluating the access points of the communication network that are candidates for being the target of a forced switching may comprise a step of analysing the behaviour of one or more mobile stations connected to the communication network 1, in particular for the purpose of identifying one or more stations that are candidates for a movement in the network. This step of analysing the behaviour of a mobile station may be based on:

detecting that this mobile station responds positively to a request for switching but does not implement it, and/or detecting that this mobile station is compatible with the switching protocol, but responds with an error message to a request to switch, and/or detecting a switching at the initiative of the mobile station.

The term "movement" is to be interpreted here as a switch of the connection of an identified station from a first access point to a second access point, following a protocol message according to IEEE 802.11v, or because of a forced switching according to a previously described embodiment.

Figure 5:
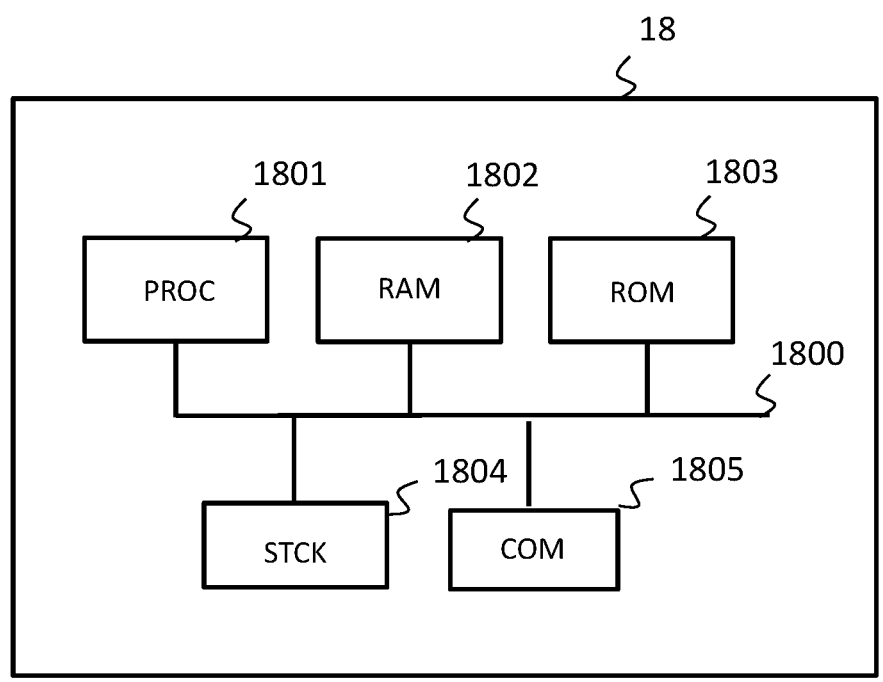

FIG. 5 illustrates schematically an example of internal architecture of any connection-management point device. We shall consider by way of illustration that FIG. 5 illustrates an internal arrangement of the connection-management device 18. It should be noted that FIG. 5 could also schematically illustrate an example of hardware architecture of a processing module included in the connection-management device 18 or a wireless access point device comprising the connection-management device 18.

According to the example of hardware architecture shown in FIG. 5, the connection-management device 18 then comprises, connected by a communication bus 1800: a processor or CPU (central processing unit) 1801; a random access memory RAM 1802; a read only memory ROM 1803; a storage unit such as a hard disk (or a storage medium reader, such as an SD (Secure Digital) card reader 1804; at least one communication interface 1805 enabling the connection-management device 18 to communicate with devices present in the communication network 1, such as for example the wireless access points 162 and 171.

The processor 1801 is capable of executing instructions loaded in the RAM 1802 from the ROM 1803, from an external memory (not shown), from a storage medium (such as an SD card), or from a communication network. When the connection-management device 18 is powered up, the processor 1801 is capable of reading instructions from the RAM 1802 and executing them. These instructions form a computer program causing the implementation, by the processor 1801, of all or part of a method described in relation to FIG. 2, FIG. 3 and FIG. 4 or the variants described of these methods.

All or part of the methods described in relation to FIG. 2, FIG. 3 and FIG. 4 or variants thereof described may be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit). In general, the connection-management device 18 comprises electronic circuitry configured for implementing the methods described in relation to the connection-management device 18. Obviously, the connection-management device 18 further comprises all the elements usually present in a system comprising a control unit and the peripherals thereof, such as a power supply circuit, a power-supply monitoring circuit, one or more clock circuits, a reset circuit, input-output ports, interrupt inputs, or bus drivers. This list being non-exhaustive.

The invention claimed is:

1. A method for switching the connection of a mobile station from a first point of wireless access to a communication network of the local area network type, comprising a system for extending wireless communication coverage to which the mobile station is connected, to a second point of wireless access to said network, the method being implemented in a connection-management device of said communication network, the method comprising:

selecting the second wireless access point as the best candidate for a wireless connection of the mobile station to said network, the second wireless access point being selected from a plurality of wireless access points of said communication network, said plurality of wireless access points comprising at least the first and second wireless access points, an evaluation of said best candidate before selection being made according to at least one predetermined criterion, requesting a switching of the wireless connection of the mobile station from the first wireless access point to the second wireless access point, according to a dedicated protocol message, and if said mobile station does not implement the requested connection switch in response to the protocol message sent:

modifying a value of a transmission parameter of at least the first wireless access point, the modified value of said parameter being a value so as to degrade the transmission performance between the first access point and the mobile station compared with a transmission based on the value of said parameter before modification, transmitting to the mobile station a message comprising a proposal to connect to the second wireless access point.

2. The method for switching the connection of a mobile station according to claim 1, wherein the at least one predetermined criterion for evaluating said best candidate being in the list:

the number of stations connected to the first wireless access point, the number of stations connected to the second wireless access point, the mean number of stations connected per wireless access point to said communication network, a reception signal strength indicator representing a signal received by the mobile station during a transmission from a wireless access point, a transmission rate to or from the mobile station.

3. The method for switching the connection of a mobile station according to claim 1, the method comprising, prior to the step of selecting the second wireless access point:

obtaining from the mobile station information representing the perception of the first and second wireless access points by the mobile station.

4. A method for switching the connection of a mobile station according to claim 1, further comprising, subsequently to the transmission to the mobile station of the message comprising a proposal to connect to the wireless access point:

detecting a connection of the mobile station to the second wireless access point, recording the modified value of the modulation or transmission-power parameter for which the connection of the mobile station to the second wireless access point was detected, in combination with an identifier of the mobile station in the communication network.

5. The method for switching the connection of a mobile station according to claim 1, wherein the transmission parameter is a modulation or power parameter.

6. A non-transitory storage medium comprising a program code instructions for executing the method according to claim 1 when said program is executed by a processor.

7. A connection-management device of a communication network of the local area network type, comprising a system for extending wireless communication coverage and a first wireless access point to which a mobile station is connected, said device comprising electronic and/or radio circuits configured for:

selecting the second wireless access point as the best candidate for a wireless connection of the mobile station to said network, the second wireless access point being selected from a plurality of wireless access points of said communication network, said plurality of wireless access points comprising at least the first and second wireless access points, an evaluation of said best candidate before selection being made according to at least one predetermined criterion, requesting a switching of the wireless connection of the mobile station from the first wireless access point to the second wireless access point, according to a dedicated protocol message, and if said mobile station does not implement the requested connection switch in response to the protocol message sent:

modifying a value of a transmission parameter of at least the first wireless access point, the modified value of said parameter being a value so as to degrade the transmission performance between the first access point and the mobile station compared with a transmission based on the value of said parameter before modification, transmitting to the mobile station a message comprising a proposal to connect to the second wireless access point.

8. The connection-management device according to claim 7, wherein said transmission parameter is a modulation or power parameter.

9. The device constituting a point of wireless access to a communication network comprising the connection-management device according to claim 7.

10. A communication network comprising the device constituting a point of wireless access according to claim 9.

11. The communication network comprising a connection-management device according to claim 7.

* * * * *